United States Patent [19]

Ross

[11] 4,072,396
[45] Feb. 7, 1978

[54] FOCUSSING OBJECTIVE MECHANISM FOR TELESCOPIC RIFLE SIGHTS

[75] Inventor: Cecil Jack Ross, El Paso, Tex.

[73] Assignee: W. R. Weaver, El Paso, Tex.

[21] Appl. No.: 594,904

[22] Filed: July 10, 1975

[51] Int. Cl.² ............................................. G02B 7/04
[52] U.S. Cl. ...................................... 350/46; 350/255
[58] Field of Search ....................... 350/46, 47, 10, 41, 350/44, 187, 255; 354/195; 74/567, 569; 192/93 A

[56] References Cited

U.S. PATENT DOCUMENTS

| 1,494,801 | 5/1924 | Pittman | 350/254 X |
| 2,446,703 | 8/1948 | Honigman | 74/567 X |
| 2,893,717 | 7/1959 | Simmons | 354/195 X |
| 3,220,308 | 11/1965 | Lareau | 354/195 X |
| 3,336,831 | 8/1967 | Unertl | 350/46 X |
| 3,431,052 | 3/1969 | Jacknau | 354/195 X |
| 3,437,404 | 4/1969 | Seedhouse | 350/255 |
| 3,516,736 | 6/1970 | Weaver | 350/255 |

FOREIGN PATENT DOCUMENTS 5,147 of 1901 United Kingdom ................ 350/255

*Primary Examiner*—David H. Rubin
*Attorney, Agent, or Firm*—William W. Jones; Paul J. Lerner

[57] ABSTRACT

A mechanism for focussing the objective lens assembly of a variable power telescopic rifle sight. A rotatable cam ring is used in conjunction with a coil spring which urges the lens assembly against the cam ring. A lens retainer portion of the lens assembly adjacent to the cam ring has formed thereon a camming ramp which is complimentary to a camming surface formed on the cam ring.

5 Claims, 3 Drawing Figures

FOCUSSING OBJECTIVE MECHANISM FOR TELESCOPIC RIFLE SIGHTS

This invention relates to a mechanism used to focus the objective lens of a telescopic rifle sight. More particularly, the mechanism of this invention utilizes a rotatable cam ring and coil spring combination to move the objective lens cell for focussing, rather than a pin and cam slot or threaded collar.

The use of an objective lens which can be focussed on objects which are different distances from the viewer is an old concept in the optical instrument art. Such focussing arrangements can be preset as to distance so as to give a clear image as, for example, with a camera. They can also be used on other optical instruments, such as range finders, rifle scopes, and the like to bring a viewed object into focus, thereby determining the range or distance of the viewed object from the viewer from a vernier disposed on the instrument.

Optical instruments such as rifle scopes which have been equipped with focussing objective lens mechanisms have, for the most part, employed a pin and cam slot mechanism for moving the objective lens assembly during focussing. U.S. Pat. No. 3,336,831, issued Aug. 22, 1967 to J. Unertl, Jr. discloses a pin and cam slot focussing arrangement which is typical of the prior art. Another focussing arrangement disclosed in the prior art involves the use of a threaded end cap which, by reason of its threads, can be turned and moved longitudinally along the scope barrel. The threaded end cap bears against an objective lens cell assembly which is spring-biased and which follows the end cap for focussing. This structure is shown in U.S. Pat. No. 3,516,736, issued June 23, 1970 to W. R. Weaver.

The focussing assemblies for objective lenses which are found in the prior art have proved generally functional, but have presented problems relating to their ability to repeat proper focus at the predetermined ranges. These problems arise from wear on the pin and cam slot, and the presence of some degree of backlash when the focussing ring is rotated in opposite directions. The problem of wear and fouling of scope barrel threads also is found in connection with the threaded cap focussing system described above. The wearing problem is magnified in the prior art systems mainly because of the minimum surface contact area between the cam surface and the cam follower.

The focussing system of this invention involves the use of a rotating cam ring having a profiled cam surface in the form of an inclined ramp on one of its faces. The objective lens holder is formed with a similar or matching cam surface taking the form of an inclined ramp on one of its faces. The matching cam ramps are held in face-to-face contact by a coil spring engaging the objective lens assembly thus providing maximum area contact between the cam ring and the lens assembly. This maximum area contact provides for increased repeatability of focus at predetermined ranges and greatly reduces the deteriorating effects of wear on the several components of the system. The coil spring eliminates the problem of backlash found in the prior art camtype focussing systems.

It is, therefore, an object of this invention to provide an objective lens focussing system for a riflescope, which focussing system produces repeatable focussing on a target at different predetermined ranges.

It is a further object of this invention to provide a focussing system of the character described wherein minimum wear of the system components is encountered.

It is yet another object of this invention to provide a focussing system of the character described wherein backlash is minimized during focussing and re-focussing.

These and other objects and advantages of the focussing system of this invention will become more readily apparent to those skilled in the art from the following detailed description of an embodiment of the invention taken in conjunction with the accompanying drawings, in which.

Figure 1:
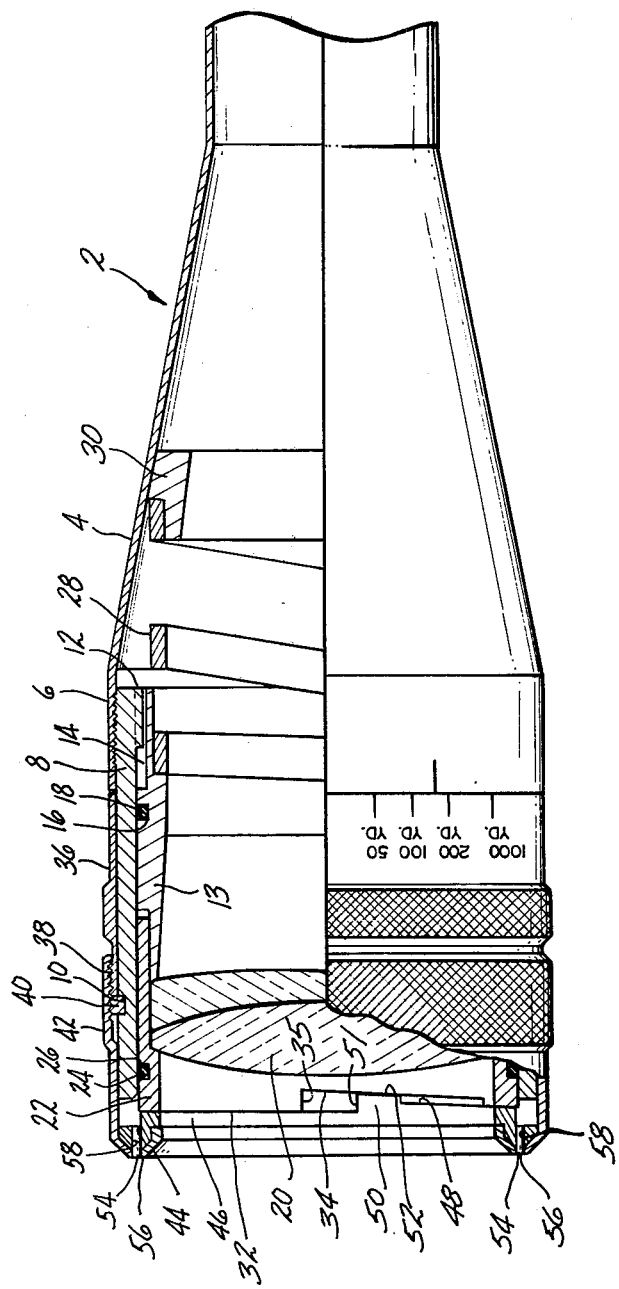
FIG. 1 is an axial sectional view of the objective end of a riflescope formed in accordance with the invention.
Figure 2:
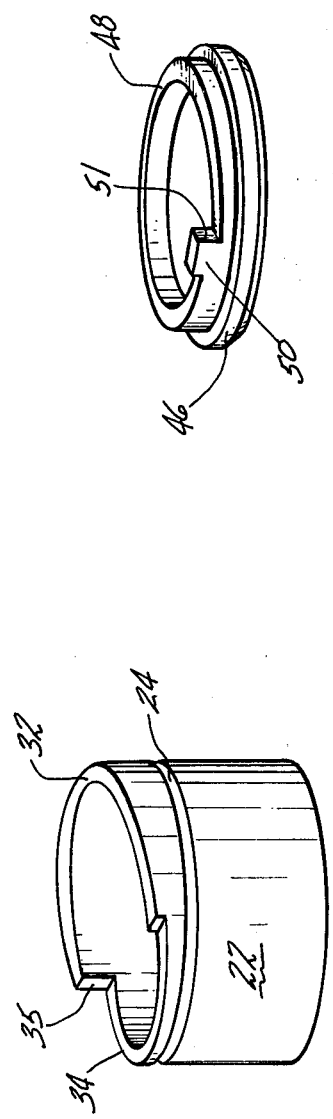
FIG. 2 is a perspective view of the front objective lens cell part of FIG. 1 showing the cam ramp end thereof.
Figure 3:
FIG. 3 is a perspective view of the cam ring showing the cam ramp surface thereon.

Referring now to the drawings, there is shown in FIG. 1 the objective end portion of a telescopic rifle sight employing the objective lens focussing assembly of this invention. The barrel of the scope is denoted generally by the numeral 2 and includes an outwardly tapering portion 4 and an enlarged internally threaded terminal portion 6. A tubular scope barrel extension 8 is threaded into the scope barrel terminal 6. The extension 8 includes an external groove 10 and a longitudinally extending inwardly projecting key 12.

Inside of the extension there is mounted an objective lens assembly which includes a rear tubular lens cell 13 having a longitudinally extending external slot 14 in which the extension key 12 is disposed. The rear lens cell includes an external groove 16 in which is mounted a gas-sealing O-ring 18. The objective lens assembly also includes an objective lens doublet 20 and a forward tubular lens cell 22 which telescopes over the rear lens cell 12 and which includes an external groove 24 in which is mounted a gas-sealing O-ring 26. A coil spring 28 is mounted within the scope barrel 2 and engages a fixed spring seat 30 on one end and the rear objective lens cell 12 on the other end. Thus the objective lens assembly is biased forwardly by the spring 28. The forward end 32 of the front lens cell 22 takes the form of a helix of predetermined pitch. The helical lens cell end 32 also includes a slot 34 the bottom wall of which is also formed with the predetermined helical pitch.

An annular graduated collar 36 is mounted on the exterior of the barrel extension 8 and includes a forward externally threaded end 38. The collar 36 is held on the extension 8 against forward movement with respect thereto by a snap-type retaining ring 40 which is mounted in the extension groove 10. An annular shroud 42 is threaded onto the collar 36 and includes an inwardly turned U-shaped forward end part 44 which serves to retain a cam ring 46 in place forward of the front lens cell 22. the cam ring 46 is formed with a rear end 48 which takes the form of a helix having the same predetermined pitch as the forward end 32 of the front objective lens cell 22. The rear end 48 of the cam ring 46 is formed with a rearwardly projecting lug 50 which has a top wall 52 formed with the same predetermined helical pitch as the bottom wall of the front lens cell groove 34.

While it is preferred to provide the entire ends 32 and 48 of the front lens cell 22 and cam ring 46 respectively, as well as the bottom wall of the slot 34 and top wall 52 of the lub 50 with the helical pitch so as to maximize the area of contact of the cam actuator, it will be appreciated that only the top wall 52 of the lub 50 and the bottom wall of the slot 34 could be helically pitched, or alternatively, only the remainder of the ends 32 and 48 of the lens cell 22 and cam ring 46 could be pitched to provide the necessary camming action. It will also be appreciated that the lug 50 and slot 34 combine to limit the extent of rotational movement in both directions of the cam ring 46 with respect to the objective lens assembly.

A pair of pins 54 are inserted into aligned holes 56 and 58 drilled in the shroud 42 and cam ring 46 respectively to secure the shroud 42 and cam ring 46 together for concurrent rotation.

The device is assembled as follows. The graduated collar 36 is mounted on the barrel extension 8 and is retained thereon by the retainer ring 40. Cement is applied to the internal threads of the scope barrel 2 and the barrel extension 8 is screwed into the barrel 2 to a depth that allows no loose linear movement of the graduated collar 36 but permits rotational movement thereof. The cement is then cured and must be free of gas leaks. The objective lens 20 is then cemented inside of the front lens cell 22 and the rear lens cell 13 is then cemented inside of the front lens cell 22. The cement is cured and must be free of gas leaks. The O-rings 18 and 26 are then positioned on the outside of the objective lens assembly. The cam ring 46 is placed inside of the shroud 42 and both are then placed on an assembly arbor fixture for future adjustment. The coil spring 28 and spring seat 30 are then assembled to the objective lens assembly and then inserted into the scope barrel - barrel extension sub-assembly with the key 12 being inserted into the key slot 14 and the spring 28 is compressed after the spring seat 30 comes into contact with the tapered portion 4 of the scope barrel 2. The fully compressed spring and lens assembly is held in place temporarily with the barrel and barrel extension by a test fixture. The shroud and cam ring sub-assembly is then moved into place over the barrel extension and then screwed fully onto the threads of the graduated collar 36.

From FIG. 1, it will be noted that a vernier scale is formed on the graduated collar 36 and an indicator mark is formed on the enlarged portion 6 of the scope barrel 2. The partially assembled device is then mounted on a fixture and sighted in on an object which is a known, fixed distnce from the sighting fixture, for example 50 yards away. The proper distance graduation, in this instance, the "50 Yd." graduation is then rotated into alignment with the indicator mark stamped on the scope barrel and the graduated collar 36 is held fixed in this position. The adjustor then looks through the scope at the fixed range target and rotates the shroud 42 in a clockwise direction on its threads. This rotates the cam ring lug 50 until its longest side wall 51 contacts the longest side wall 35 of the front lens cell groove 34, which is the builtin "low range" stop for the cam ring 46. The cam ring 46 will then stop rotating but clockwise unscrewing of the shroud 42 is continued resulting in forward axial movement of the objective lens assembly resulting from pressure thereon by the spring 28. The unscrewing action of the shroud 42 is continued until the scope focuses on the fixed range (50 yd.) target. The scope is then removed from the focussing fixture and cement is applied to the threads of the shroud 42 and graduated collar 36, which cement is allowed to cure securing the shroud 42 to the collar 36 so that the two will thereafter rotate together. The holes 56–58 are then drilled in the shroud 42 and cam ring 46 and the pins 54 are inserted therein to lock the shroud 42 and cam ring 46 together for concurrent rotation. Assembly is then complete.

It will be readily appreciated that the mating helical cam surfaces on the cam ring and objective lens cell assembly will result in rotational movement of the graduated collar, shroud and cam ring (which rotate together as a unit) being translated into longitudinal movement of the objective lens assembly, aided by the coil spring. This longitudinal movement of the objective lens assembly results in focussing of the scope at predetermined different distances, which are marked on the graduated collar. The use of matched helical cam surfaces on the cam ring and lens cell provides maximum contact area for the focussing mechanism which results in a minimum of wear, and also permits the cam ring and lens cells to be made of molded plastic material, if desired. The coil spring acting in concert with the cam surfaces reduces focussing backlash to a minimum and increases the accuracy of the device. The use of a projecting lug and slot combination in the mating cam surfaces provides convenient high and low range focus stops for the device.

Since many changes and variations of the disclosed embodiment of the invention may be made without departing from the inventive concept, it is not intended to limit the invention otherwise than as required by the appended claims.

What is claimed is:

1. A focussing objective mechanism for a telescopic gun sight comprising in combination:
    a. a sight barrel;
    b. an objective lens assembly mounted in said barrel for axial reciprocal movement therein, said lens assembly having one end wall thereof formed with a predetermined helical pitch extending for substantially the entire duration of said one end wall;
    c. a ring rotatably mounted on said barrel but fixed against axial movement thereon, said ring being adjacent to said lens assembly and having an end surface facing said lens assembly end wall, substantially the entire duration of said end surface which faces said lens assembly end wall being formed with the same predetermined helical pitch as said lens assembly end wall; and
    d. spring means engaging said lens assembly to bias said end wall into engagement with said ring end surface.

2. The mechanism of claim 1, wherein one of said end wall and said end surface is formed with a slot having a bottom wall formed with said predetermined helical pitch, and the other of said end wall and said end surface is formed with a projecting lug having an end wall formed with said predetermined helical pitch, said lug being disposed in said slot, and said slot and said lug having respective side walls forming stops governing the degree of rotation which said ring can undergo.

3. A focussing objective mechanism for a telescopic gun sight comprising in combination:
    a. a sight barrel;
    b. an objective lens assembly mounted in said barrel for axial reciprocal movement therein, said lens assembly having one end wall thereof formed with a predetermined helical pitch over substantially its entire extent, said end wall including a slot having a bottom wall formed with said predetermined helical pitch, and said slot having side walls;

c. a ring rotatably mounted on said barrel but fixed against axial movement thereon, said ring being adjacent to said lens assembly and having an end surface formed with said predetermined helical pitch throughout substantially its entire extent, said end surface facing said lens assembly end wall, and said end surface including a projecting lug disposed within the confines of said slot and having an end wall formed with said predetermined helical pitch and side walls, the respective slot and lug side walls forming stops defining the rotational arc through which said ring can be turned; and d. spring means biasing said lens assembly toward said ring to urge said lens assembly end wall into face-to-face contact with said ring end surface.

4. A focussing objective mechanism for a telescopic gun sight comprising in combination:

a. means forming a sight barrel;

b. an objective lens assembly mounted in said sight barrel for reciprocal axial sliding movement therein, said lens assembly including one end wall formed with a predetermined helical pitch;

c. means fixing said lens assembly against rotational movement in said sight barrel;

d. a focussing collar mounted on said sight barrel for rotational movement thereon, said collar having one end thereof which is threaded;

e. means for preventing said collar from moving axially of said sight barrel;

f. a shroud screwed onto said collar;

g. a camming ring carried by said shroud, said camming ring having an end surface facing said lens assembly end wall, said end surface being formed with the same predetermined helical pitch;

h. spring means engaging said lens assembly to bias said end wall thereof into face-to-face contact with said end surface of said camming ring;

i. means securing said camming ring to said shroud; and j. means securing said shroud to said collar to prevent said shroud from being unscrewed from said collar and to enable said collar, said shroud and said camming ring to be concurrently rotated to focus said lens assembly at a plurality of different distances from the sight.

5. The mechanism of claim 4, further comprising cooperating slot means and lug means formed on said contacting end wall and end surface of said lens assembly and camming ring, said lug means being disposed in said slot means to form rotational stops for the focussing mechanism.

* * * * *

UNITED STATES PATENT OFFICE
CERTIFICATE OF CORRECTION

Patent No. 4,072,396   Dated February 7, 1978

Inventor(s) Cecil Jack Ross

It is certified that error appears in the above-identified patent and that said Letters Patent are hereby corrected as shown below:

Col. 3, line 2: "lub" should read --lug--.

Col. 3, line 4: "lub" should read --lug--.

Col. 3, line 49: "distnce" should read --distance--.

Col. 3, line 59: "builtin" should read --built-in--.

Signed and Sealed this

Eleventh Day of November 1980

[SEAL]

Attest:

SIDNEY A. DIAMOND

Attesting Officer

Commissioner of Patents and Trademarks